July 6, 1937.  C. E. SCHLENKER  2,086,302
MECHANICAL MOVEMENT
Filed Nov. 15, 1935  2 Sheets—Sheet 1

Inventor
C. E. Schlenker.

By Lacey & Lacey,
Attorneys

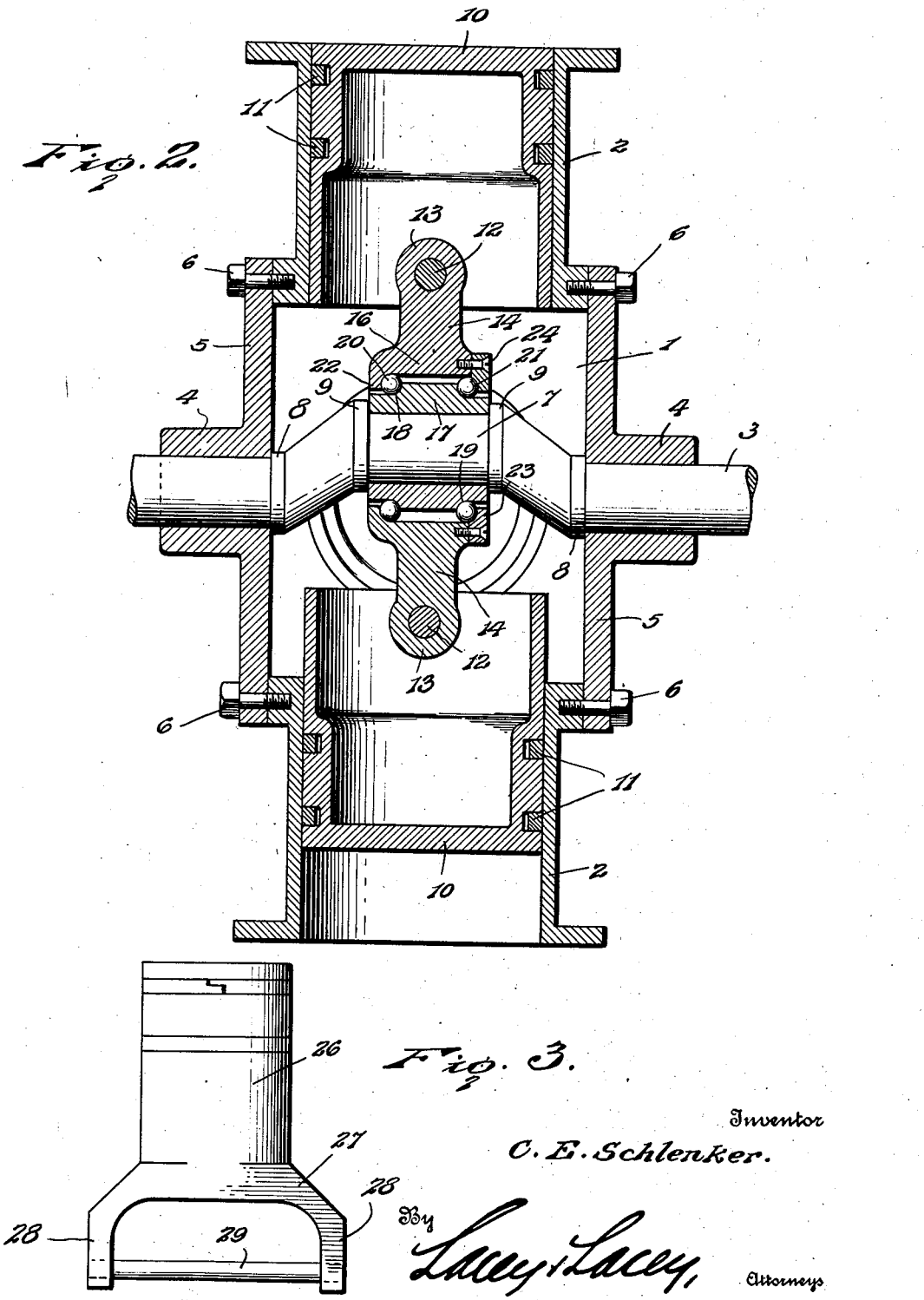

Patented July 6, 1937

2,086,302

UNITED STATES PATENT OFFICE 2,086,302

MECHANICAL MOVEMENT

Charles E. Schlenker, Cleveland, Ohio, assignor of one-half to Curt E. Kaiser, Shoshoni, Wyo.

Application November 15, 1935, Serial No. 50,054

6 Claims. (Cl. 74—50)

This invention relates to a mechanical movement whereby reciprocating motion may be transmitted from a rotary crank shaft to the pistons of a pump or internal combustion engine, and one object of the invention is to provide a structure of this character wherein the pistons are disposed in radiating relation to a crank shaft and so connected with the crank portion thereof that as the crank shaft turns, the pistons will be reciprocated in the cylinders in which they work and pistons disposed at right angles to each other permitted to reciprocate without interfering with each other.

Another object of the invention is to provide an operating connection between the pistons and the crank portion of the crank shaft which will be very strong and durable and operate very easily.

The invention is illustrated in the accompanying drawings, wherein,

Figure 2 is a sectional view taken along the line 2—2 of Figure 1.

Figure 3 is a view in side elevation of a modified form of piston which permits a piston to have a longer stroke.

Figure 1:
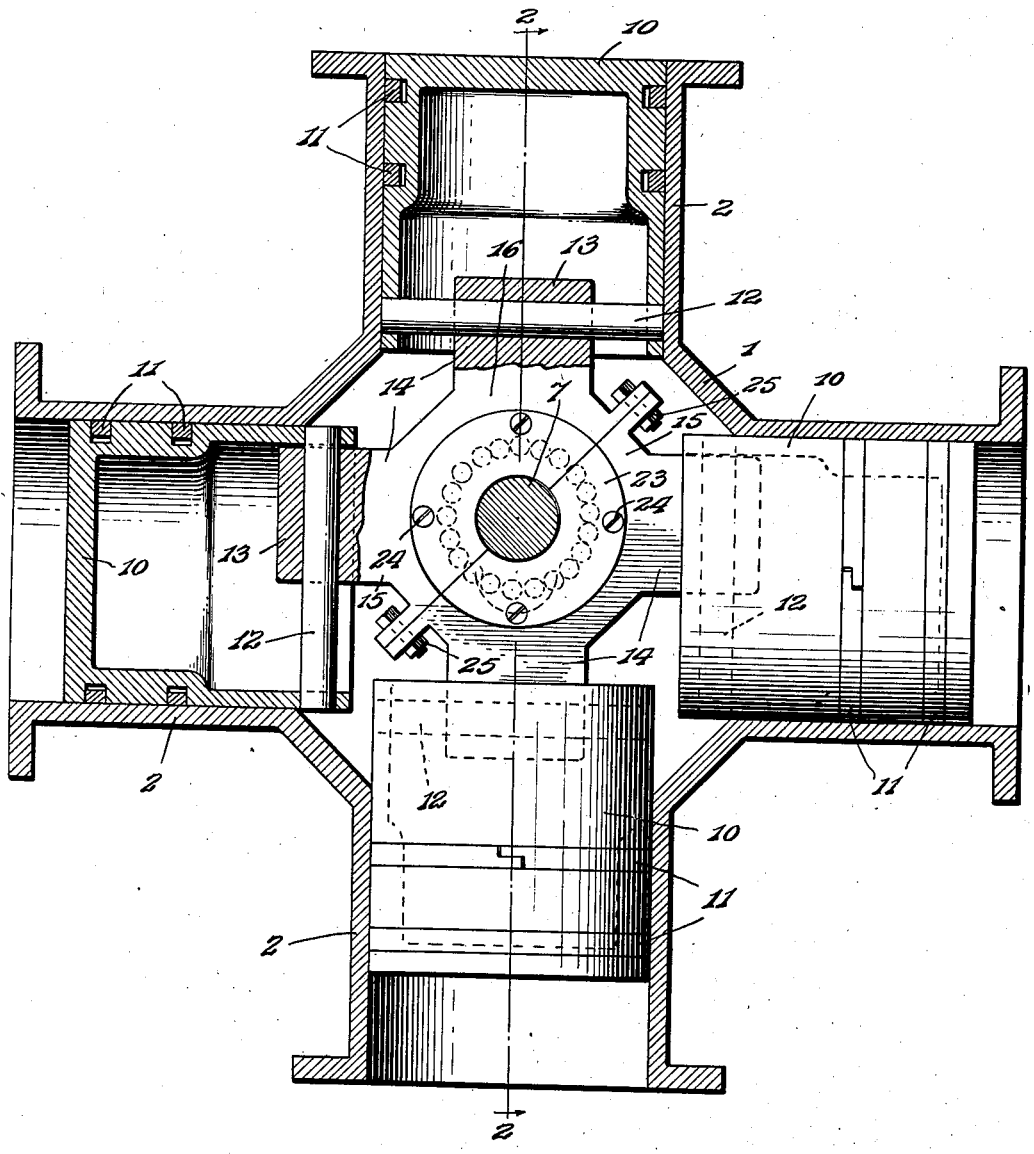
Figure 1 is a sectional view illustrating an application of the improved mechanical movement.

In the accompanying drawings, the numeral 1 indicates a crank case which is formed of strong metal and carries cylindrical portions 2 which are spaced from each other 90° apart about the crank case and may be inner sections of pump cylinders or corresponding sections of the cylinders of an internal combustion engine.

The crank shaft 3 extends axially of the crank case 1 and is journaled through bearings 4 carried by heads 5 which are secured at opposite sides of the crank case by bolts 6 and within the crank case the shaft 3 is formed with a crank portion 7 having collars or flanges 8 which prevent the shaft from sliding longitudinally through the bearings 4. Other collars or flanges 9 are also provided upon the crank for a purpose to be hereinafter set forth. It will thus be seen that the crank shaft will be rotatably mounted axially of the crank case and very effectively prevented from having longitudinal movement through the bearings 4.

The pistons 10 are slidably received in the cylinders 2 for reciprocating movement therein and carry the usual rings 11 to provide a tight seal between the pistons and walls of the cylinders. Each of the pistons carries a pin 12 extending diametrically through the same adjacent its inner end and these pins pass through sleeves 13 formed at the outer ends of arms 14 carried by the separable sections 15 of a collar 16. The collar 16 fits about a bushing 17 which is also formed of companion sections and fits about the crank 7 between the flanges 9, as shown in Figure 2, and referring to this figure it will be seen that the bushing is formed to provide races 18 and 19 to receive bearing balls 20 and 21. These balls are disposed within the collar 16, the balls 20 being engaged by a flange 22 at one side of the collar and the balls 21 being held in place by a retainer ring 23 formed of companion sections, as shown in Figure 1, and secured to the collar by screws 24. It will thus be seen that removing the screws 24 which hold the ring sections in place and removing the bolts 25 which secure the collar sections 15 to each other, the collar, ring sections and bushing 17 may be removed for cleaning or repairs. Of course, the pins 12 must be withdrawn from the pistons before the collar sections can be removed from the crank case.

When a pump or engine having the improved mechanical movement incorporated therein is in operation, the shaft 3 rotates and the pistons reciprocate in the cylinders. The sleeves 13 of the collar are loose upon the pins 12 and, therefore, as one pair of opposed pins move transversely of the other pair, one pair of sleeves 13 will slide longitudinally upon the pins 12 of the second pair of pistons. This is clearly shown in Figure 1. It will thus be seen that the arms 14 need not have pivotal movement relative to the collar 16 and that pistons disposed transversely of each other will not interfere with reciprocating motion of the pistons in the cylinders. In the embodiment illustrated in Figures 1 and 2, the length of the piston stroke is limited to the internal diameter of a piston. If a longer stroke is desired, the piston may be constructed as shown in Figure 3 and referring to this figure it will be seen that the piston 26 has a proportionately greater length than the pistons 10 and at its inner end is formed with a yoke 27 with its arms 28 spaced from each other a distance appreciably greater than the external diameter of the cylinder. These arms may, therefore, carry a pin 29 of appreciably greater length than the pins 12. It will, of course, be understood that when the pistons 26 are in use, the yokes will be disposed within the crank case 1 which will be of greater dimension than that shown in Figures 1 and 2 and as the sleeves 13 will slide upon the pins 29 from one arm 28 to the other, a piston may have a stroke of greater length than the pistons 10.

Having thus described the invention, what is claimed as new is:

1. In a mechanical movement, a casing having cylinders extending therefrom, a crank shaft journaled through said casing with its crank within the casing, pistons slidable in the cylinders, pins extending diametrically of said pistons, and a collar loosely mounted about the crank within the casing and formed of sections detachably secured to each other and having rigid arms extending radially of the collar and crank and having their outer end portions engaged about the pins and slidable longitudinally thereon.

2. A mechanical movement including a rotary crank shaft, a collar rotatable about the crank of the crank shaft and having radiating arms formed rigidly therewith and provided with transverse bores adjacent their outer ends, and members mounted for reciprocating movement radially of the crank shaft and provided with transversely extending pins loosely engaged through the bores of said arms.

3. In a mechanical movement, a rotary crank shaft, a collar rotatably receiving the crank of said shaft and formed of sections detachably secured to each other, said collar having radiating arms formed rigid with the sections and having transversely extending bores, a set of opposed reciprocating members, a second set of opposed reciprocating members disposed transversely of the first mentioned reciprocating members, and pins extending diametrically of the reciprocating members and loosely engaged through the bores of said arms whereby the arms engaged with the pins of one set of reciprocating members may slide longitudinally upon the pins while the other set of members is reciprocating.

4. In a mechanical movement, a casing having cylinders radiating therefrom, a crank shaft journaled through said casing and having its crank within the casing, pistons reciprocating in said cylinders, pins carried by said pistons and extending diametrically thereof, a bushing rotatable about the crank of said crank shaft, a collar about said bushing formed of segmental sections secured in end to end relation to each other, anti-friction members between the collar and bushing, and arms rigid with the sections of said collar extending radially therefrom and formed with transverse bores loosely receiving said pins whereby the arms may have sliding movement longitudinally of the pins during rotation of the crank shaft and reciprocation of the pistons.

5. In a mechanical movement, a casing, a crank shaft journaled through the casing and having its crank within the casing, cylinders radiating from the casing, pistons slidable in said cylinders, a collar in the casing rotatably receiving the crank of said shaft and consisting of segmental sections secured to each other and each having rigid arms extending therefrom radially of the collar and formed with transverse bores at their outer ends, yokes at the inner ends of said pistons having arms projecting from inner ends of the pistons with their free end portions spaced from each other a distance greater than the diameter of a cylinder, and pins rigidly carried by said arms of the pistons and extending diametrically of the cylinders through the bores of the arms of the collar whereby the arms of the collar may slide longitudinally upon the pins during rotation of the crank shaft and reciprocation of the pistons.

6. In a mechanical movement, a casing, cylinders radiating from the casing, pistons slidable in said cylinders, pins carried by and extending diametrically of said pistons, a crank shaft journaled through the casing and having its crank within the casing, a bushing fitting about the crank of said crank shaft, the crank being formed with abutments engaging opposite ends of said bushing to hold the bushing centered upon the crank, a sectional collar disposed about said bushing and having its sections detachably secured to each other, bearing balls between the collar and end portions of said bushing, a flange carried by said collar for holding the bearing balls in place about one end portion of the bushing, ring sections detachably secured to the collar and holding the bearing balls in place about the other end portion of the bushing, and arms rigid with the collar and extending radially thereof and formed with transverse bores loosely receiving said pins whereby the arms may have sliding movement upon the pins during reciprocation of the pistons and rotation of the crank shaft.

CHARLES E. SCHLENKER